United States Patent [19]

Bülbring

[11] Patent Number: 4,761,133
[45] Date of Patent: Aug. 2, 1988

[54] PRESSURIZED FLUIDIZED-BED COMBUSTION BURNER

[75] Inventor: Jürgen Bülbring, Gevelsberg, Fed. Rep. of Germany

[73] Assignee: Deutsche Babcock Werke Aktiengesellschaft, Oberhausen, Fed. Rep. of Germany

[21] Appl. No.: 63,249

[22] Filed: Jun. 17, 1987

[30] Foreign Application Priority Data

Aug. 23, 1986 [DE] Fed. Rep. of Germany ....... 3628675

[51] Int. Cl.$^4$ ............................................. F23D 19/00
[52] U.S. Cl. .................................................. 431/170
[58] Field of Search ........................... 431/170, 328, 7; 422/139, 143, 146; 122/40; 110/263; 432/58, 14

[56] References Cited

U.S. PATENT DOCUMENTS

| | | | |
|---|---|---|---|
| 4,445,844 | 5/1984 | Matthews | 122/40 |
| 4,490,157 | 12/1984 | Fernandes | 431/170 |
| 4,584,949 | 4/1986 | Brannstrom | 431/170 |
| 4,655,147 | 4/1987 | Brannstrom et al. | 431/170 |
| 4,667,610 | 5/1987 | Meier et al. | 431/170 |

Primary Examiner—Randall L. Green
Attorney, Agent, or Firm—Max Fogiel

[57] ABSTRACT

A pressurized fluidized bed burner with a pressurized container. The container is provided with an air-supply connection and accommodates a combustion chamber. The combustion chamber is provided with an air box to supply combustion air. A compressor and a preliminary air heater are accommodated in the air line leading to the pressurized container. The object is to exploit lost heat to heat the combustion air and to prevent the wall of the pressurized container from being exposed to additional thermal stress. The pressurized container has an air-extraction connection. The intake end of the preliminary air heater communicates with the air-extraction connection. Its outlet end communicates with the air box in the combustion chamber through an air line that extends through the pressurized container.

4 Claims, 2 Drawing Sheets

PRESSURIZED FLUIDIZED-BED COMBUSTION BURNER

BACKGROUND OF THE INVENTION

The present invention relates to a pressurized fluidized bed. Heated air flows through the pressurized container of a known fluidized bed burner that can operate either in the atmosphere or under pressure (1984 Technical Bulletin, pp. 304–06) and arrives in the bed through an air box. The wall of the pressurized container is exposed to heat from the heated air and must be designed to withstand the stress. Whereas the thermal stress is comparatively slight when the device is operated in the atmosphere, the wall of a container that is operated under pressure must be fairly thick, which considerably increases the weight of the container. Attempts have been made to avoid the problem in this known fluidized bed burner by diverting the preliminary air heater through a bypass line. The air is accordingly heated in the preliminary heater only in atmospheric operation. Although lost heat is usually exploited to practical purpose in a preliminary air heater, that advantage is lost when the heater is diverted.

The pilot burners that start another known fluidized bed burner (VDI Report 322 [1978], 89) are positioned near the air box and inside the pressurized container. Pilot burners located there, however, are hard to access and tend to get clogged up.

SUMMARY OF THE INVENTION

The object of the present invention is to improve a generic fluidized bed burner to the extent that available lost heat is exploited to heat the combustion air and the wall of the pressurized container is not exposed to additional thermal stress.

This object is attained in accordance with the invention in a generic fluidized bed burner by means of the characteristics recited in the body of claim 1. Positioning the preliminary air heater in the path of the air downstream of the pressurized container keeps the air that acts on the wall of the pressurized container, which establishes the pressure, comparatively cool. The air that is heated by exploiting the lost heat is channeled to the fluidized bed burner in such a way that it no longer comes into contact with the wall of the pressurized container, which need accordingly be designed to withstand only the pressure and the comparatively low temperature.

The line that extends from the preliminary air heater to the air box of the fluidized bed burner allows the pilot burner to be positioned outside the pressurized container and facilitates mixing the flue gases generated in the pilot burner with the combustion air.

A preferred embodiment of the invention will hereinafter be described with reference to the appended drawings. It is to be understood, however, that this is merely by way of example and that the scope of the protection sought for the invention is defined exclusively in the claims.

DETAILED DESCRIPTION OF THE PREFERRED EMBODIMENTS

Figure 1:
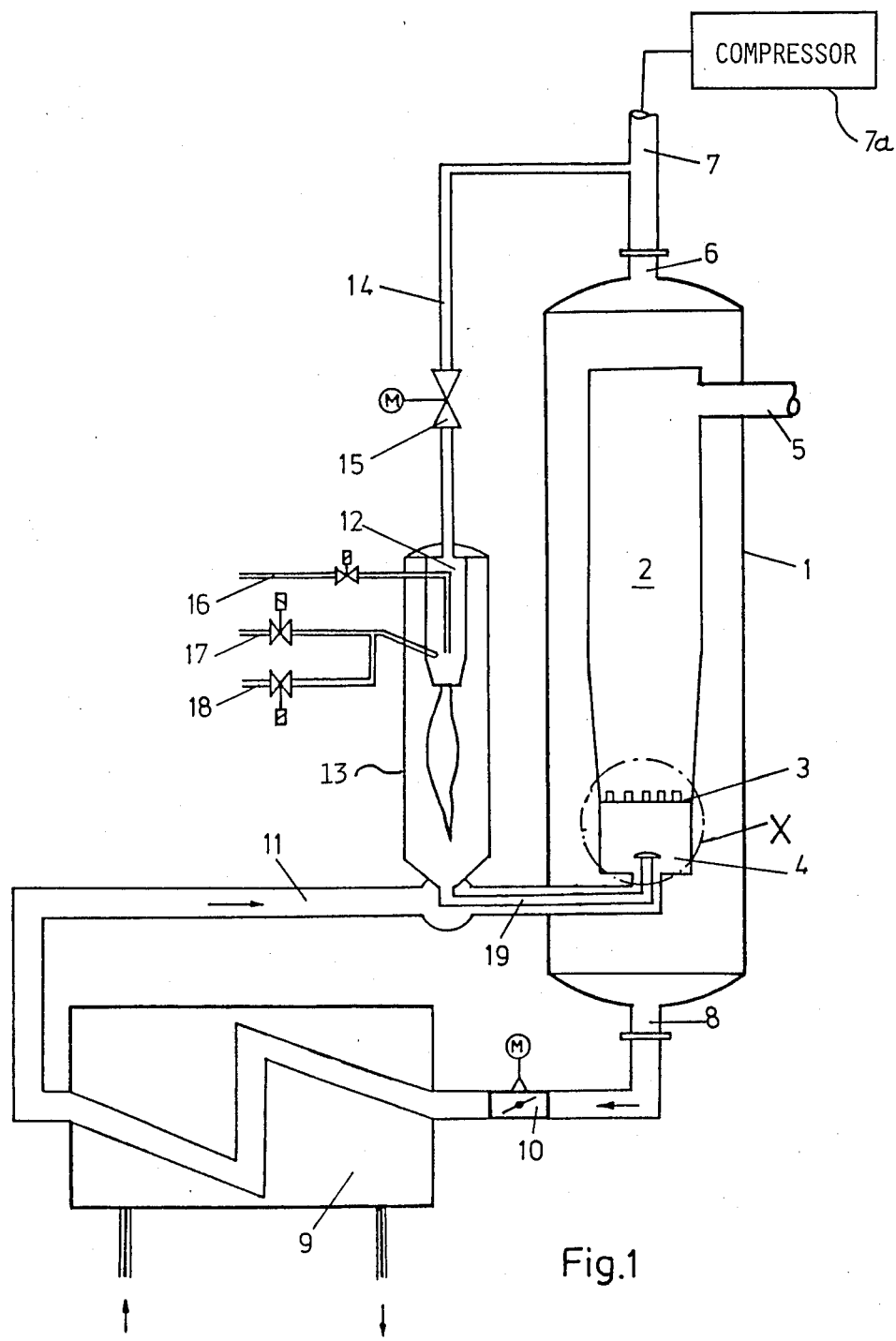
FIG. 1 is a schematic side view of a fluidized bed burner in accordance with the invention and FIG. 2 is a detail of the area X in FIG. 1.
Figure 2:
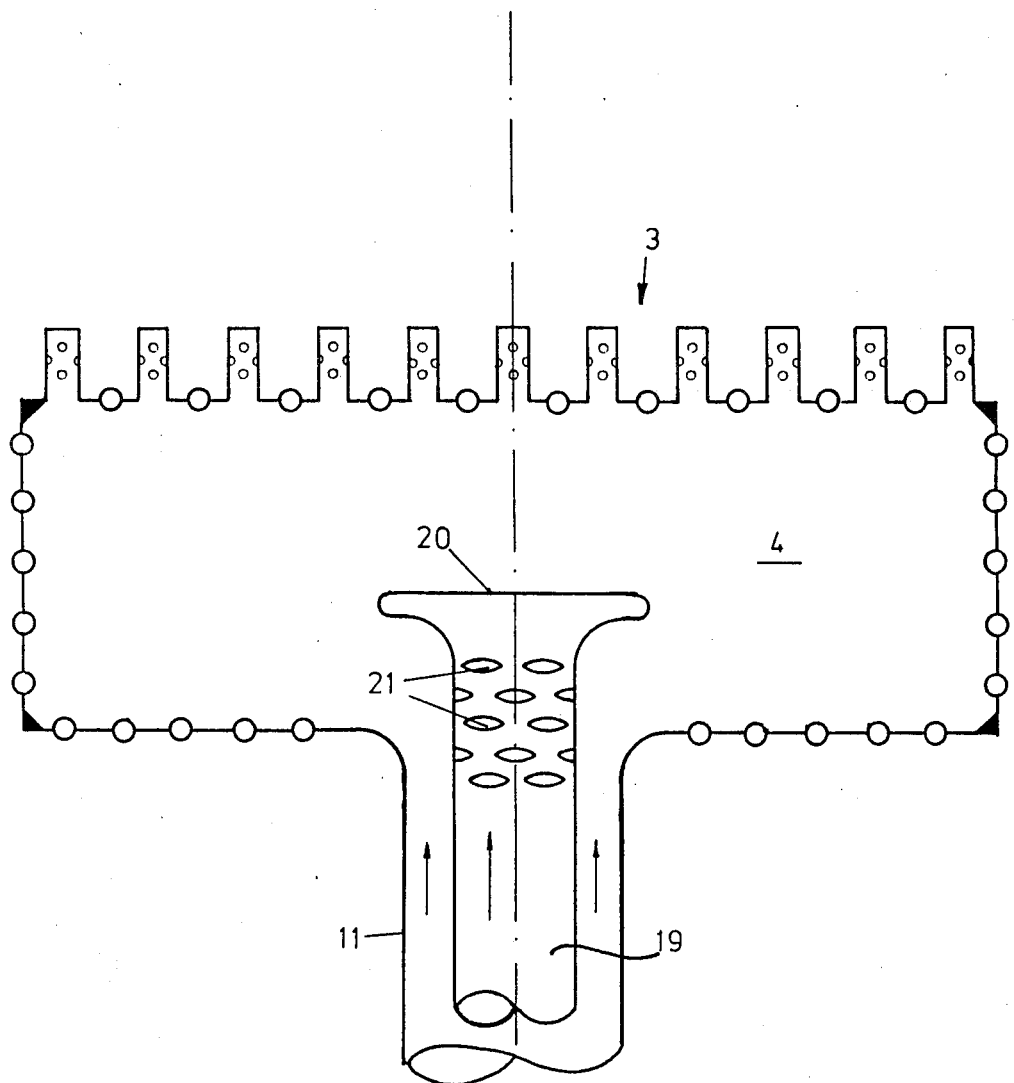

The combustion chamber 2 of a pressurized fluidized bed burner is accommodated inside a pressurized container 1. Combustion chamber 2 is demarcated by pressure-resistant and gas-tight walls made out of piping. Below its inflow floor 3 is an air box 4. Fuel is supplied to combustion chamber 2 in a known way, pneumatically for instance through an unillustrated line. The fuel is burned by combustion air that enters combustion chamber 2 from air box 4 through inflow floor 3. The fuel is coal that has lime mixed into it to bind the sulfur. Connected to the top of combustion chamber 2 is a flue-gas line 5 that extends through pressurized container 1. The flue gas is supplied to a boiler or gas turbine.

Pressurized container 1 is supplied with an air-supply connection 6 that communicates with an air-supply line 7. Air-supply line 7 communicates with a compressor 7a that compresses the air entering pressurized container 1.

Pressurized container 1 also has an air-extraction connection 8 that communicates with the intake end of a preliminary air heater 9. A damper 10 is positioned upstream of the entrance to preliminary air heater 9. The function of preliminary air heater 9 is to exploit lost heat, and it is heated by flue gas. The air-end exit from preliminary air heater 9 communicates with an air line 11 that extends through pressurized container 1 and opens into air box 4.

The air arriving from the compressor is not only compressed but also heated by the heat of compression. This air flows through pressurized container 1 and equalizes the pressures in pressurized container 1 and in combustion chamber 2. Once it has emerged from pressurized container 1 through air-extraction connection 8, the air is heated in preliminary air heater 9 by exploiting the lost heat. The heated air is then channeled to combustion chamber 2 in such a way that it does not come into contact with the wall of pressurized container 1. Thus the container is essentially subjected only to pressure.

The air line 11 that leads from preliminary air heater 9 to air box 4 makes it possible in a practical way to accommodate the pilot burner 12 needed to start the fluidized bed burner outside pressurized container 1. Pilot burner 12 is enclosed in a pressure-resistant jacket 13 and communicates with air-supply line 7 through a branch 14 that can be blocked off by means of a valve 15 accommodated in it. Pilot burner 12 is also provided with supply lines 16, 17, and 18 that supply it with oil or gas and auxiliary air. The outlet end of pressure-resistant jacket 13 communicates with a line 19 positioned coaxially inside air line 11. Coaxial line 19 empties into air box 4.

The end of coaxial line 19 that extends into air box 4 is closed off with a plate 20. The diameter of plate 20 is longer than that of line 19 and approximately equals that of air line 11. The outlet end of coaxial line 19 is provided with elliptical slot-like perforations 21. Perforations 21 are distributed in a ring around coaxial line 19. The hot flue gas produced by pilot burner 12 emerges through perforations 21 and soon mixes thoroughly with the air supplied through the annular space between air line 11 and coaxial line 19. The cross-section of the terminal section of coaxial line 19 expands to equal that of plate 20, promoting the flow of flue gas and air. The ratio of the air flowing through preliminary air heater 9 to the air flowing through pilot burner 12 can be regulated during the startup procedure by means of damper 10 when valve 15 is open. A prescribed temperature can accordingly be attained during startup.

The invention has been described herein with reference to an exemplary embodiment. It will be understood, however, that it is receptable of various modifications, which will offer themselves to those skilled in the art and which are intended to be encompassed within the protection sought for the invention as set forth in the appended claims.

I claim:

1. A pressurized fluidized bed burner comprising: A pressurized container with an air supply connection and having a combustion chamber with an air box for supplying combustion air to said combustion chamber; An air line connected to said pressurized container and extending into said pressurized container; A compressor attached to said air supply connection; A preliminary air heater; An air extraction connection on said pressurized container; An intake end on said preliminary air heater communicating with said air extraction connection; an outlet end on said preliminary air heater communicating with said air box of said combustion chamber through said air line which extends into said pressurized container.

2. A pressurized fluidized bed burner as defined in claim 1, including a pilot burner enclosed in a pressure-resistant jacket outside of said pressurized container; said pressurized container enclosing said combustion chamber; an auxiliary line positioned coaxially inside said air line and opening into said air box; an exit on said pilot burner communicating with said auxiliary line.

3. A pressurized fluidized bed burner as defined in claim 2, wherein said auxiliary line has an exit end inside said air box, and perforations distributed in a ring around said exit end of said auxiliary line.

4. A pressurized fluidized bed burner as defined in claim 3, wherein said perforations are elliptical with a slot-shaped cross-section.

* * * * *